US008485937B2

(12) United States Patent
Zhou

(10) Patent No.: US 8,485,937 B2
(45) Date of Patent: Jul. 16, 2013

(54) CLAMPING DEVICE FOR A CUTTING MEMBER

(75) Inventor: Hongtao Zhou, Nanjing (CN)

(73) Assignee: Chervon (HK) Limited, Wanchai (HK)

( * ) Notice: Subject to any disclaimer, the term of this patent is extended or adjusted under 35 U.S.C. 154(b) by 260 days.

(21) Appl. No.: 13/110,127

(22) Filed: May 18, 2011

(65) Prior Publication Data

US 2011/0287887 A1 Nov. 24, 2011

(30) Foreign Application Priority Data

May 19, 2010 (CN) ...................... 2010 2 0195645 U

(51) Int. Cl.
*F16H 57/08* (2006.01)

(52) U.S. Cl.
USPC .............................. 475/337; 475/340; 83/481

(58) Field of Classification Search
USPC ................. 475/263–265, 269, 296, 317, 318, 475/331, 337, 340; 83/374, 375, 481, 471.3
See application file for complete search history.

(56) References Cited

U.S. PATENT DOCUMENTS

| | | | | |
|---|---|---|---|---|
| 4,955,744 | A | 9/1990 | Barth et al. | |
| 7,343,841 | B2 | 3/2008 | Phillips et al. | |
| 7,465,248 | B2 * | 12/2008 | Katoh et al. .................. | 475/264 |
| 2006/0101975 | A1 * | 5/2006 | Phillips et al. ............. | 83/698.41 |

* cited by examiner

*Primary Examiner* — Justin Holmes
(74) *Attorney, Agent, or Firm* — McDermott Will & Emery LLP

(57) ABSTRACT

The present application provides a clamping device for a cutting member having a rotating sleeve and a quick clamping body. The clamping device has a first sun gear arranged in the center of the rotating sleeve, a first stage planetary gear having multiple planetary gears cooperating with the first sun gear, and a second stage planetary gear having multiple planetary gears cooperating with a second sun gear arranged on the planetary carrier. An inner ring gear may also be arranged outside of the first and second stage planetary gears and the head of the quick clamping body. Also, the clamping device of the present application does not need a special tool to remove the saw blade, which may lower the required effort to allow for the clamp to clamp the saw blade more quickly and more reliably.

16 Claims, 3 Drawing Sheets

CLAMPING DEVICE FOR A CUTTING MEMBER

CROSS-REFERENCE TO RELATED APPLICATIONS

This application claims priority to CN 201020195645.2, filed May 19, 2010, which is hereby incorporated by reference.

FEDERALLY SPONSORED RESEARCH OR DEVELOPMENT

Not Applicable.

TECHNICAL FIELD

The present application relates to a clamping device for a cutting member, and more particularly, to a clamping device for a rotating cutting member or a swinging cutting member.

BACKGROUND OF THE INVENTION

Cutting members may be divided into a reciprocating type, a rotating type and a swinging type depending on the operation mode. The different types of cutting members and operation modes generally require different types of clamping devices. In a conventional electric circular saw, the saw blade is mounted by screwing a flange to the threaded portion of a shaft with a spanner to clamp the cutting member between the shaft shoulder and the flange and then compressing it with friction force. When it needs to be replaced, the flange may be released by the spinner or pre-released by a screw driver and a hammer and then screwed off by the spinner. In the conventional electric circular saw, the saw blade needs to be mounted with a special tool, and the process for mounting and clamping the saw blade is laborious, unsafe and not easily operated, while the device for clamping the saw blade is also relatively larger in size.

SUMMARY OF THE INVENTION

One problem to be solved by the present application is to provide a clamping device which is suitable for a rotating cutting member or a swinging cutting member and does not require special tool to remove the saw blade. Another problem to be solved by the present application is to provide a clamping device with compact structure, thereby saving space and reducing size.

In order to address the above problems, the present application provides a clamping device for a cutting member, which includes a rotating sleeve and a quick clamping body. It also may have a first sun gear arranged in the center of the inner side of the rotating sleeve and a first stage planetary gear having multiple planetary gears cooperating with the first sun gear. The multiple planetary gears may be arranged on multiple pins of a planetary carrier. It also may have a second stage planetary gear with multiple planetary gears cooperating with a second sun gear arranged on the planetary carrier. The multiple planetary gears may be arranged on multiple pins of the quick clamping body. The quick clamping body may also include a disc-shaped head and a cylindrical tail with an inner ring gear being arranged outside of the first and second stage planetary gears and the head of the quick clamping body. The planetary carrier, the quick clamping body and the rotating sleeve may also be coaxial with respect to each other.

The head of the quick clamping body may also have an inclined end surface at the outer edge, and the inner ring gear may have an inclined end surface at the inner side of an end surface which may cooperate with the inclined end surface of the head of the quick clamping body. The inner gear may also be mounted and secured axially into the rotating sleeve by a collar for the hole. The cutting member may also include a spring washer arranged between the rotating sleeve and the first stage planetary gear. And a washer may be arranged between the inner ring gear and the collar for the hole.

The first stage planetary gear may include three planetary gears, and a clearance fit is formed between the first stage planetary gear and the pins of the planetary carrier and also between the rotating sleeve and the inner ring gear. The second stage planetary gear may also include three planetary gears, and a clearance fit may be formed between the second stage planetary gear and the pins of the planetary carrier and also between the planetary carrier and the inner ring gear. The inner ring gear may have a circular one-piece configuration and may have a detachable configuration including two parallel-arranged annular portions which are connected by a connecting pin. Finally, the inner ring gear may engage with the first stage planetary gear and the second stage planetary gear with the same number of teeth.

The present application reduces the effort required by using a two-stage planetary gear transmission. When the output torque is constant, the larger the transmission ratio is, the smaller the input torque. In other words, when the force for clamping the saw blade is constant, the larger the transmission ratio is, the smaller the clamping force or the releasing force required to be exerted by the hand, thereby saving effort. When rotating the rotating sleeve, the quick clamping body is screwed into the output shaft axially and presses the inner ring gear after the end surface of the inner ring gear comes into contact with the end surface of the outer flange. Then the inner ring gear may press the outer flange and the outer flange may press the saw blade so that the saw blade may be clamped gradually with the rotation of the rotating sleeve until the rotating sleeve cannot be rotated any further. As a larger torque force is needed to clamp the saw blade, the two-stage planetary gear transmission is provided, and the transmission ratio is proportional to the torque. In other words, the end of the rotating sleeve to be screwed is input end, and the end of the quick clamping body is output end, then $i=(z_2/z_1+1)^2$, wherein $z_2$ denotes the teeth number of the inner ring gear (the larger gear), and $z_1$ denotes the teeth number of the sun gear (the smaller gear), $i>1$. When the torque of the output end is constant, the larger i is, the smaller the torque of the input end is. The function of the spring washer is to provide some damping between the rotating sleeve and the inner ring gear or between the rotating sleeve and the planetary gear, so that the inner ring gear and the rotating sleeve are fixed relatively and rotate together when the end surface of the inner ring gear is free from outer force.

Further, the clamping device for a cutting member according to the present application does not need a special tool to remove the saw blade, which may save effort and clamp the saw blade quickly and more reliably. The clamping device is suitable for the cutting members which rotate or swing around the shaft during cutting, for example, circular rotating cutting members, such as circular saw blade, circular grinding piece and circular grinding wheel, and other noncircular rotating or swinging cutting members. Meanwhile, the two-stage planetary gear transmission of the present application utilizes a common inner ring gear, which saves space, reduces size and obtains a compact structure.

Moreover, the spring washer arranged between the end surface of the inner ring gear and the inner chamber of the rotating sleeve has a function of damping so that the inner ring gear and the rotating sleeve are fixed relatively, and the inner ring gear may rotate with the rotation of the rotating sleeve until it doesn't rotate when the end surface of the inner ring gear is affected by the damping of the outer flange.

BRIEF DESCRIPTION OF THE DRAWINGS

To understand the present application, it will now be described by way of example, with reference to the accompanying drawings in which.

DETAILED DESCRIPTION

Figure 1:
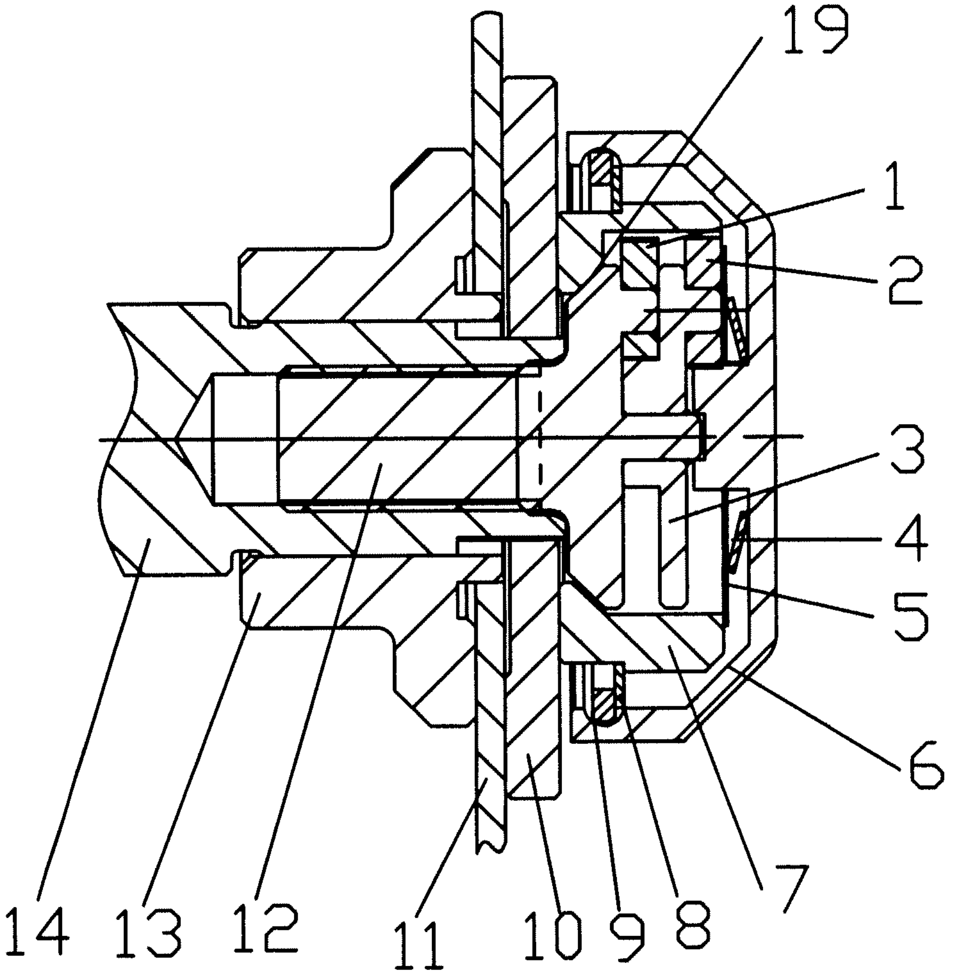
FIG. 1 is a side structural view of a first embodiment of the present application.
Figure 2:
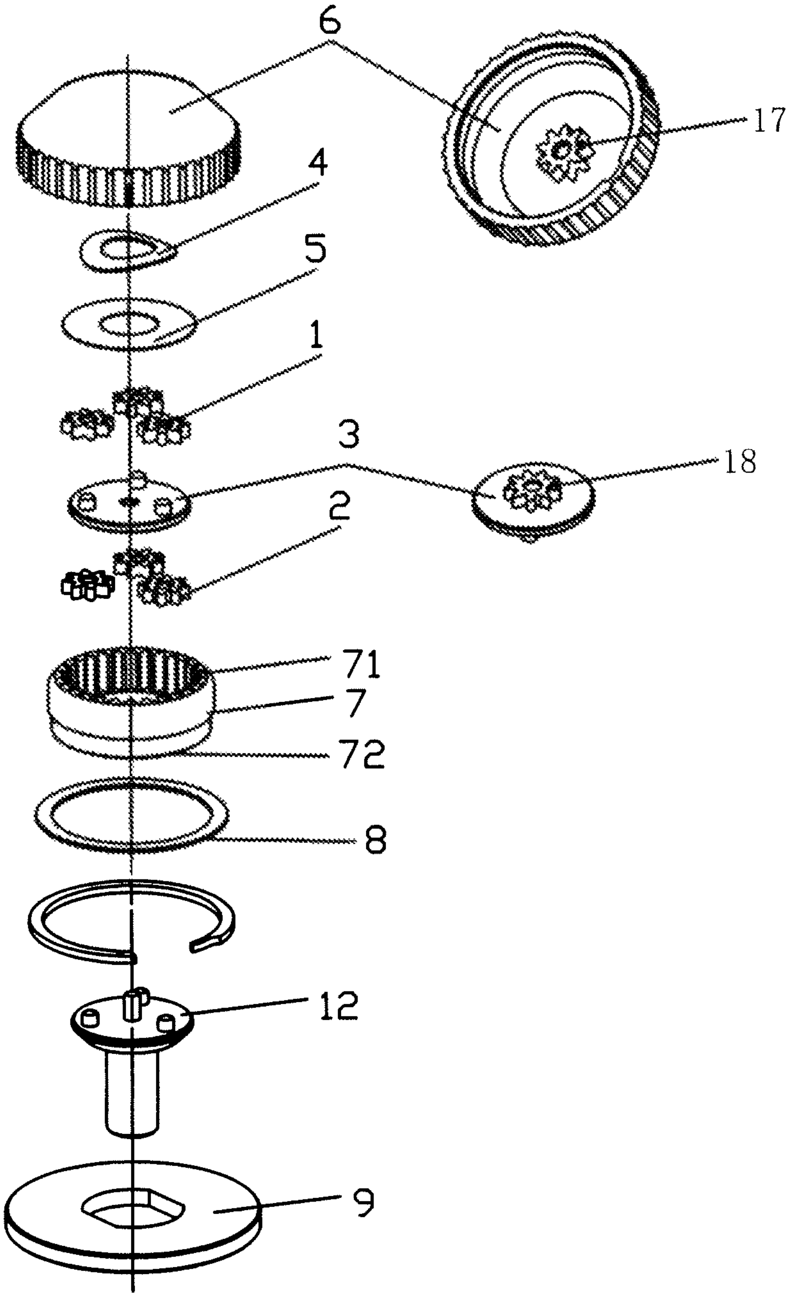
FIG. 2 is an exploded view of the first embodiment of the present application.

FIG. 1 is a side schematic view of a first embodiment of the present application, and FIG. 2 is an exploded view of the first embodiment of the present application. In the first embodiment, a clamping device for a cutting member includes a rotating sleeve 6 and a quick clamping body 12. A first sun gear 17 is arranged in the center of the inner side of the rotating sleeve 6. A first stage planetary gear 1 includes three planetary gears arranged on three pins of a planetary carrier 3 respectively, and cooperates with the first sun gear 17. A second stage planetary gear 2 includes three planetary gears arranged on three pins of the quick clamping body 12 respectively, and cooperates with a second sun gear 18 arranged on the planetary carrier 3. The quick clamping body 12 includes a disc-shaped head and a cylindrical tail, and an inner ring gear 7 is arranged outside of the first and second stage planetary gears 1, 2 and the head of the quick clamping body 12. The head of the quick clamping body 12 has an inclined end surface 19 at the outer edge, and the inner ring gear 7 has an inclined end surface at the inner side of the end surface 72 which may cooperate with the inclined end surface 19 of the quick clamping body. The planetary carrier 3, the quick clamping body 12 and the rotating sleeve 6 are coaxial with each other. The inner ring gear 7 is mounted and secured axially into the rotating sleeve 6 by a collar 9 for the hole. A spring washer 4 and a washer 5 are arranged between the rotating sleeve 6 and the first stage planetary gear 1. A washer 8 and an elastic collar for the hole are arranged between the inner ring gear 7 and the collar 9 for the hole. The inner ring gear 7 engages with the first stage planetary gear 1 and the second stage planetary gear 2 with the same number of teeth.

Figure 3:
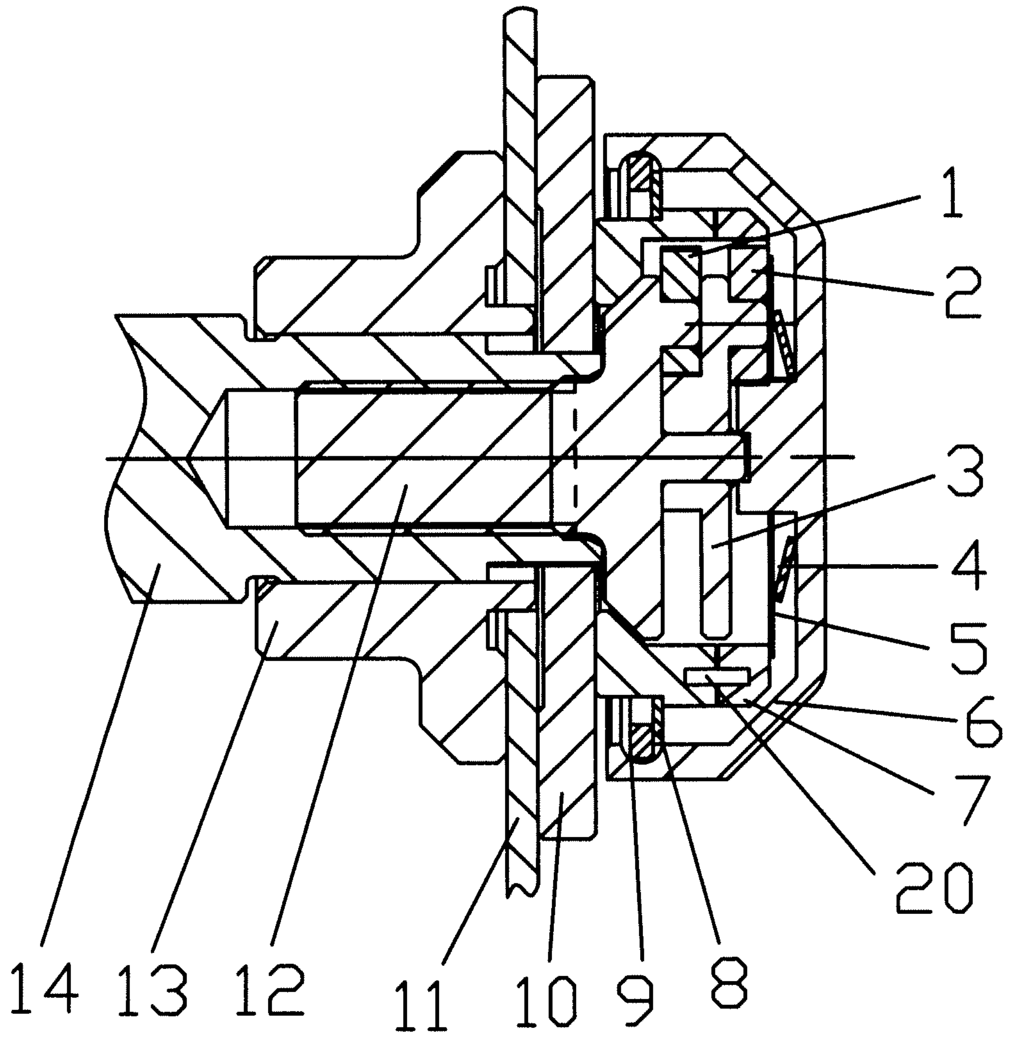
FIG. 3 is a side structural view of a second embodiment of the present application.

FIG. 3 is a schematic structural view of a second embodiment of the present application. In the second embodiment, the inner ring gear 7 has a detachable configuration including two parallel-arranged annular portions which are connected by a connecting pin 20. For the detachable inner ring gear 7, two layers of the inner ring gear may have different numbers of teeth, and two layers of the planetary gear and the sun gear may also have different numbers of teeth, while the other configurations are the same with the first embodiment.

In use, to clamp the saw blade with the clamping device using the present application, the saw blade and outer flange 10 are mounted and the shaft lock is pressed so that the output shaft 14 does not rotate. Then, rotating the rotating sleeve, as the washer 5 under the spring washer 4 compresses the end surface of the inner ring gear, the inner ring gear does not rotate relative to the rotating sleeve under the friction force, thus the planetary gear does not rotate so that the quick clamping body 12 and the rotating sleeve do not rotate relatively and the rotating sleeve causes the quick clamping body to screw into the threaded hole of the output shaft 14. Gradually, the end surface 72 of the inner ring gear comes into contact with the outer flange, and rotates the rotating sleeve continually and the end surface 72 of the inner ring gear compresses the outer flange 10. And when the friction force between the end surface 72 and the outer flange is larger than that between the end surface 71 and the spring washer, the inner ring gear 7 would be fixed relative to the outer flange 10. Rotating the rotating sleeve so that the rotating sleeve and the inner ring gear begin to rotate relatively, the first sun gear in the rotating sleeve is engaged with the three planetary gears of the first stage and as the inner ring gear does not rotate, the planetary carrier 3 rotates. The second sun gear 18 on the planetary carrier is engaged with the three planetary gears of the second stage and as the inner ring gear does not rotate, the quick clamping body rotates. With the screwing of the quick clamping body 12 into the output shaft, the inclined end surface 19 of the quick clamping body presses the inner ring gear and the inner ring gear presses the outer flange 10 and the outer flange presses the saw blade 11 to clamp the saw blade. The two-stage planetary gear transmission has an increased transmission ratio, thereby requiring less effort. In addition, the two-stage planetary gears have a common inner ring gear, thus it saves space significantly and has a quick clamping mechanism with compact structure.

To release the saw blade the shaft lock is pressed, and the rotating sleeve is rotated until the quick clamping body is screwed out of the output shaft completely, removing the outer flange and then removing the saw blade.

The above contents are preferable embodiments of the present application, but are not intended to limit the present application. All the technical solutions obtained by equal replacement or equivalent change may fall into the protection scope of the present application.

What is claimed is:

1. A clamping device for a cutting member, comprising:

a rotating sleeve and a quick clamping body, wherein a first sun gear is arranged in the center of the inner side of the rotating sleeve;

a first stage planetary gear having multiple planetary gears cooperating with the first sun gear, the multiple planetary gears being arranged on multiple pins of a planetary carrier;

a second stage planetary gear having multiple planetary gears cooperating with a second sun gear arranged on the planetary carrier, and the multiple planetary gears being arranged on multiple pins of the quick clamping body;

the quick clamping body including a disc-shape head and a cylindrical tail, and an inner ring gear being arranged outside of the first stage planetary gear, the second stage planetary gear and the head of the quick clamping body; and, the planetary carrier, the quick clamping body and the rotating sleeve being coaxial with each other.

2. The clamping device according to claim 1, wherein the head of the quick clamping body further comprises an inclined end surface at the outer edge, and the inner ring gear has an inclined end surface at the inner side of the end surface which may cooperate with the inclined end surface of the head of the quick clamping body.

3. The clamping device according to claim 1, wherein the inner ring gear is mounted and secured axially into the rotating sleeve by a collar for the hole.

4. The clamping device according to claim 1, further comprising a spring washer arranged between the rotating sleeve and the first stage planetary gear.

5. The clamping device according to claim 1, further comprising a washer arranged between the inner ring gear and the collar for the hole.

6. The clamping device according to claim 1, wherein the first stage planetary gear includes three planetary gears, and the clearance fit is formed between the first stage planetary gear and the pins of the planetary carrier and also between the rotating sleeve and the inner ring gear.

7. The clamping device according to claim 1, wherein the second stage planetary gear includes three planetary gears, and the clearance fit is formed between the second stage planetary gear and the pins of the planetary carrier and also between the planetary carrier and the inner ring gear.

8. The clamping device according to claim 1, wherein the inner ring gear has a detachable configuration including two parallel-arranged annular portions which are connected by a connecting pin.

9. The clamping device according to claim 1, wherein the inner ring gear has a circular one-piece configuration.

10. The clamping device according to claim 9, wherein the inner ring gear engages with the first stage planetary gear and the second stage planetary gear with the same number of the teeth.

11. A clamping device for a cutting member, comprising:

a rotating sleeve and a quick clamping body, wherein a first sun gear is arranged in the center of the inner side of the rotating sleeve;

a first stage planetary gear having multiple planetary gears cooperating with the first sun gear, the multiple planetary gears being arranged on multiple pins of a planetary carrier;

a second stage planetary gear having multiple planetary gears cooperating with a second sun gear arranged on the planetary carrier, and the multiple planetary gears being arranged on multiple pins of the quick clamping body;

the quick clamping body including a disc-shape head and a cylindrical tail, and an inner ring gear being arranged outside of the first stage planetary gear, the second stage planetary gear and the head of the quick clamping body, wherein the head of the quick clamping body further comprises an inclined end surface at the outer edge, and the inner ring gear has an inclined end surface at the inner side of the end surface which may cooperate with the inclined end surface of the head of the quick clamping body, and further wherein the inner ring gear is mounted and secured axially into the rotating sleeve by a collar for the hole;

a washer arranged between the inner ring gear and the collar for the hole; and, the planetary carrier, the quick clamping body and the rotating sleeve being coaxial with each other.

12. The clamping device according to claim 11, wherein the first stage planetary gear includes three planetary gears, and the clearance fit is formed between the first stage planetary gear and the pins of the planetary carrier and also between the rotating sleeve and the inner ring gear.

13. The clamping device according to claim 11, wherein the second stage planetary gear includes three planetary gears, and the clearance fit is formed between the second stage planetary gear and the pins of the planetary carrier and also between the planetary carrier and the inner ring gear.

14. The clamping device according to claim 11, wherein the inner ring gear has a detachable configuration including two parallel-arranged annular portions which are connected by a connecting pin.

15. The clamping device according to claim 11, wherein the inner ring gear has a circular one-piece configuration.

16. The clamping device according to claim 15, wherein the inner ring gear engages with the first stage planetary gear and the second stage planetary gear with the same number of the teeth.

* * * * *